(12) United States Patent
Sato et al.

(10) Patent No.: US 10,900,569 B2
(45) Date of Patent: Jan. 26, 2021

(54) PACKING

(71) Applicant: YAMADA MANUFACTURING CO., LTD., Kiryu (JP)

(72) Inventors: Tomokazu Sato, Kiryu (JP); Yasuhiro Kosugi, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 121 days.

(21) Appl. No.: 16/160,902

(22) Filed: Oct. 15, 2018

(65) Prior Publication Data

US 2019/0128424 A1    May 2, 2019

(30) Foreign Application Priority Data

Oct. 31, 2017   (JP) .................. 2017-211098

(51) Int. Cl.
  *F16J 15/10*   (2006.01)
  *F16J 15/02*   (2006.01)

(52) U.S. Cl.
  CPC ........... *F16J 15/104* (2013.01); *F16J 15/025* (2013.01); *F16J 15/106* (2013.01)

(58) Field of Classification Search
  CPC .......... F16J 15/104; F16J 15/10; F16J 15/106; F16J 15/22; F16J 15/32; F16J 15/025; F16J 15/02; F16J 15/46; F16J 15/48
  USPC ...................................................... 277/644
  See application file for complete search history.

(56) References Cited

U.S. PATENT DOCUMENTS

| | | | | |
|---|---|---|---|---|
| 2,873,132 A | * | 2/1959 | Tanner | F16J 15/32 277/436 |
| 3,550,990 A | * | 12/1970 | Carlson, Jr. | F16J 15/106 277/566 |
| 10,072,776 B2 | * | 9/2018 | Kocourek | F16J 15/062 |
| 2009/0206558 A1 | * | 8/2009 | Nameki | F16J 15/062 277/644 |

FOREIGN PATENT DOCUMENTS

JP    2016-080167 A    5/2016

* cited by examiner

*Primary Examiner* — Nathan Cumar
(74) *Attorney, Agent, or Firm* — McGinn I.P. Law Group, PLLC.

(57) ABSTRACT

A packing having an annular shape in a longitudinal direction and a uniform cross section, includes a top surface arcuate part, a bottom surface side arcuate part, and side arcuate parts on both sides as viewed in cross section. Opposite ends of the top surface arcuate part and the side arcuate parts on both sides are connected by upper connection surfaces, and opposite ends of the bottom surface side arcuate part and the side arcuate parts on both sides are connected by lower connection surfaces, and the packing has a maximum width between the side arcuate parts on both sides. An angle formed by a segment which connects a peak on the top surface arcuate part and a lowermost point of the bottom surface side arcuate part, and a vertical line passing through the lowermost point, is formed as an outward or inward inclination with respect to the annular shape.

18 Claims, 5 Drawing Sheets

Fig.1A

FIRST ENBODIMENT

ENLARGED AND VIEWED IN DIRECTION OF ARROWS X1
ENLARGED AND VIEWED IN DIRECTION OF ARROWS X2
ENLARGED AND VIEWED IN DIRECTION OF ARROWS X3

FIRST ENBODIMENT

FIRST ENBODIMENT

Fig.4B

ENLARGED AND VIEWED IN DIRECTION OF ARROWS X4
ENLARGED AND VIEWED IN DIRECTION OF ARROWS X5
ENLARGED AND VIEWED IN DIRECTION OF ARROWS X6

Fig.4C

THIRD EMBODIMENT

PACKING

BACKGROUND OF THE INVENTION

1. Field of the Invention

The present invention relates to a durable and reliable packing provided in any of grooves between a housing main body and a cover plate in a housing that is required to have airtightness in a device such as a pump and an engine, the packing allowing coming-off prevention from the groove and falling-prevention to be achieved in spite of the low filling ratio, allowing the mold cost and manufacturing cost to be reduced, and allowing the sealing performance to be uniform and stable.

2. Description of the Related Art

A number of conventional sealing members such as an O-ring and a seal member have been used at parts required to have airtightness between a housing main body and a cover plate which form a housing in a device such as a pump and an engine. A groove is formed at one of the housing main body and the cover plate in order to mount the sealing member between connection surfaces of components such as the housing main body and the cover plate, and the sealing member is inserted and arranged in the groove.

Some sealing member have protrusions so that the members each inserted in a groove does not come off or drop easily from the groove during assembling of the housing main body and the cover plate or transport to other factories, etc., and the sealing member is prevented from dropping as the protrusions are fitted in the groove. A typical example of the configuration is disclosed in Japanese Patent Application Publication No. 2016-80167, and work inefficiency associated with dropping of a sealing member from a groove during assembling of the housing main body is solved. Note that the sealing member is referred to as a "gasket" in Japanese Patent Application Publication No. 2016-80167, and the term "gasket" will be used in the following description of Japanese Patent Application Publication No. 2016-80167.

SUMMARY OF THE INVENTION

There is still another problem associated with mounting of the gasket to a device. The problem exists in that when the gasket is mounted to the groove, or when apart of the gasket in an insertion position which protrudes from the groove, in other words, a part in close contact with a cover plate is pressed against the cover plate, the vicinity of the peak of a cross section orthogonal to the longitudinal direction of the gasket falls inwardly or outwardly in some cases.

This may cause the gasket to deform and the airtightness may be degraded, and it is highly likely that desired sealing performance may not be obtained. According to the disclosure of Japanese Patent Application Publication No. 2016-80167, in order to solve the problem by preventing the gasket from deforming to fall, protrusions for preventing falling referred to as falling-prevention protrusions are provided on both sides of the gasket main body in the widthwise direction.

In the disclosure of Japanese Patent Application Publication No. 2016-80167, the falling-prevention protrusions are provided in the same locations on both sides in the widthwise direction of the gasket main body, only at the outer or inner peripheral surface, or alternately on the outer peripheral surface and the inner peripheral surface. The presence of the falling-prevention protrusions provided at the gasket in the manner prevents the gasket from falling and deforming undesirably.

However, since the falling-prevention protrusions are provided at the gasket, the gasket has an increased cross sectional area for the falling-prevention protrusions, which increases the filling ratio of the gasket with respect to the groove when the gasket is inserted in the groove. More specifically, the ratio of the cross sectional area of the groove occupied by the cross sectional area of the gasket increases. When the filling ratio thus increases, apart of the gasket protruding from the groove increases. This may give rise to another problem.

Generally speaking, in a device used with a fluid such as a pump in which a gasket is used, the pressure of the fluid inside often acts from the inner side to the outer side of the housing. More specifically, the gasket is subject to pressure in the direction from the inner side to the outer side of the housing.

However, a device such as an engine, a pump, and a mission required to have airtightness is adapted to work with or controls a fluid such as water or oil. During the operation of the device, the pressure of the fluid inside may fluctuate. Particularly in a pump, the pressure of the fluid changes and the fluctuation range is likely to be large. Therefore, the fluid partly may come in through a very small gap between the housing main body and the cover plate, and the pressure of the fluid may be applied on the gasket.

The pressure of the fluid applied on the gasket acts in the direction from the inner side to the outer side of the housing most of the time, the upper part of the gasket in cross section orthogonal to the longitudinal direction of the gasket where the gasket receives the pressure is pressed outwardly most of the time and has its upper part inclined to fall. When the gasket filling ratio is high as in the disclosure of Japanese Patent Application Publication No. 2016-80167, a part of the gasket may come into a small gap between the housing main body and the cover plate from the groove. When this is repeated, the gasket deteriorates, and sufficient airtightness cannot be maintained. Therefore, it is an object of the present invention to solve these problems associated with the gasket.

In order to solve the problems, the inventor has arrived at, as a result of intensive research, a packing having an annular shape in a longitudinal direction and a uniform cross section in the longitudinal direction according to a first embodiment of the present invention, the packing has a top surface arcuate part, a bottom surface side arcuate part, and side arcuate parts on both sides as viewed in cross section, opposite ends of the top surface arcuate part and the side arcuate parts on both sides are connected by upper connection surfaces, the opposite ends of the bottom surface side arcuate part and the side arcuate parts on both sides are connected by lower connection surfaces, the packing has a maximum width between the side arcuate parts on both sides, and an angle formed by a segment which connects a peak on the top surface arcuate part in a height-wise direction and a lowermost point of the bottom surface side arcuate part in the height-wise direction, and a vertical line passing through the lowermost point, is formed as an outward or inward inclination with respect to the annular shape, and thus the object has been achieved.

According to a second embodiment of the invention, the angle is formed as an outward inclination with respect to the annular shape in the packing according to the first embodiment, and thus the object has been achieved. According to a third embodiment of the present invention, the angle is formed as an inward inclination with respect to the annular shape in the packing according to the first embodiment, and thus the object has been achieved.

According to a fourth embodiment of the present invention, the bottom surface side arcuate part is formed of a large-width bottom arcuate part having a large radius of curvature on a center side, and bottom end arcuate parts having a small radius of curvature and connected to opposite ends of the bottom arcuate part in the packing according to the second or third embodiment, and thus the object has been achieved. According to a fifth embodiment of the present invention, the upper connection surfaces on both sides and the lower connection surfaces on both sides have a flat or recessed shape in the packing according to the second or third embodiment, and thus the object has been achieved.

According to a sixth embodiment of the present invention, the lower connection surfaces on both sides and the upper connection surface on the inner side have a flat or recessed shape, the top surface arcuate part has an outer side formed to protrude further outward in the packing according to the second or third embodiment, and thus the object has been achieved. According to a seventh embodiment of the present invention, in the packing according to the fourth embodiment, when radii of curvature of the bottom arcuate part, the top surface arcuate part, and the side arcuate parts are $R1$, $R2$, and $R3$, respectively, the following expression is established.

$$R3 < R2 \leq R1$$

Thus the object has been achieved.

A packing according to an eighth embodiment of the present invention has an annular shape in a longitudinal direction, the packing has a top surface arcuate part, a bottom surface side arcuate part, and side arcuate parts on both sides as viewed in cross section, opposite ends of the top surface arcuate part and the side arcuate parts on both sides are connected by upper connection surfaces, opposite ends of the bottom surface side arcuate part and the side arcuate parts on both sides are connected by lower connection surfaces, the packing has a maximum width between the side arcuate parts on both sides, an angle formed by a segment which connects a peak on the top surface arcuate part in a height-wise direction and a lowermost point of the bottom surface side arcuate part in the height-wise direction, and a vertical line passing through the lowermost point, is formed as an outward or inward inclination with respect to the annular shape, the angle at a part of the annular shape in the longitudinal direction is formed as an outward inclination with respect to the annular shape, and the angle at another part of the annular shape in the longitudinal direction is formed as an inward inclination with respect to the annular shape, and thus the object has been achieved.

A packing according to a ninth embodiment of the present invention has an annular shape in a longitudinal direction and a uniform cross section in the longitudinal direction, the packing has a top surface arcuate part, a bottom surface side arcuate part, and side arcuate parts on both sides as viewed in cross section, opposite ends of the top surface arcuate part and the side arcuate parts on both sides are connected by upper connection surfaces, opposite ends of the bottom surface side arcuate part and the side arcuate parts on both sides are connected by lower connection surfaces, the packing has a maximum width between the side arcuate parts on both sides, a peak on the top surface arcuate part in the height-wise direction is present on the vertical line passing through a center position of the bottom surface side arcuate part in the widthwise direction, and thus the object has been achieved.

According to a tenth embodiment of the present invention, the upper connection surfaces on both sides and the lower connection surfaces on both sides have a flat or recessed shape in the packing according to the ninth embodiment, and thus the object have been achieved.

In a housing in a device such as an engine, a pump, and a mission filled with water, oil, etc. required to have airtightness, a packing according to the present invention may be inserted, with a low filling ratio, into a groove into which the packing is to be inserted, and especially, the packing has arcuate shapes rather than flat shapes at the upper and lower surfaces, and in particular, an arcuate shape at the bottom, so that surface pressure generated at the time of squashing the packing (mounting the packing) is increased, and even higher sealing performance (adhesion) can be provided. This is because the contact area is reduced.

Furthermore, the packing has an annular shape and a uniform cross section along the entire periphery, which eliminates the necessity of using a complicated mold shape, and the mold cost and thus the manufacturing cost can be reduced. In addition, since the packing has an annular shape and a uniform cross section along the entire periphery, the sealing function (the tensile force of rubber) can advantageously be uniform and stable. The cross sectional shape allows the filling ratio to be reduced preferably to 90% or less for the entire periphery. Furthermore, simply stated, when localized high pressure is generated using a packing and only a part of the packing protrudes outwardly, the packing could be cut and leakage therefrom may be caused, but the disadvantage may be solved by the annular shape and the uniform cross section.

Also according to the present invention, the angle formed by the segment which connects the peak on the top surface arcuate part in the height-wise direction and the lowermost point of the bottom surface side arcuate part in the height-wise direction and the vertical line passing through the lowermost point is formed as an outward or inward inclination with respect to the annular shape, so that increase in the pressure inside or outside the annular shape can be addressed successfully. More specifically, falling attributable to pressure can be prevented successfully. Since the packing has a maximum width between the side arcuate parts on both sides in the center position in the up-down direction, the packing can be prevented from coming off from the groove successfully and advantageously.

DESCRIPTION OF THE PREFERRED EMBODIMENTS

Figure 1A:
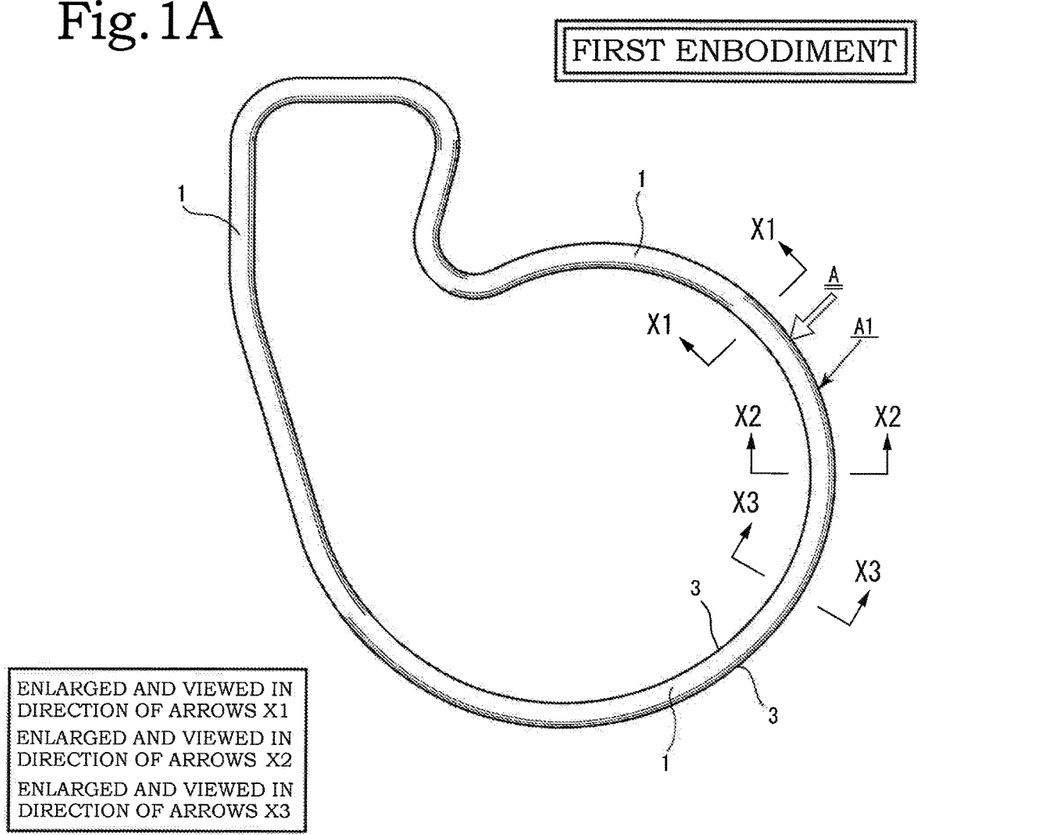
FIG. 1A is a plan view of a packing according to a first embodiment of the present invention.
Figure 1B:
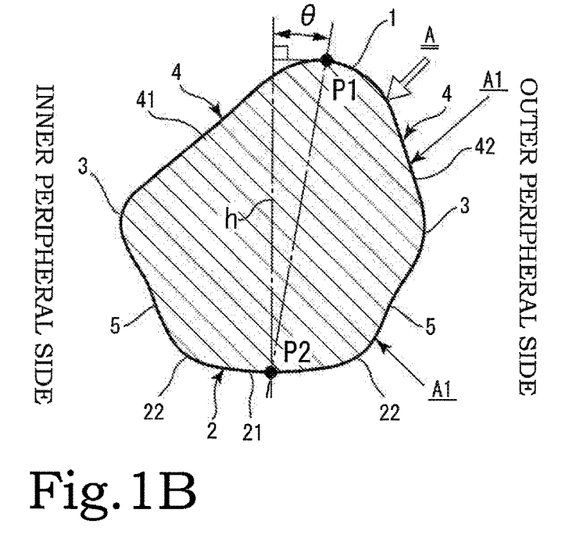
FIG. 1B is an enlarged cross sectional view as viewed in the directions of arrows X1, X2, and X3 in FIG. 1A.
Figure 1C:
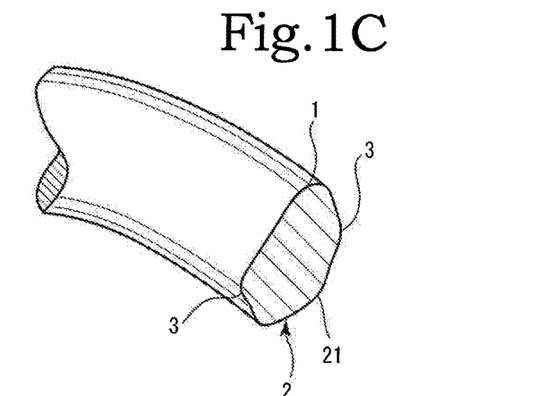
FIG. 1C is a partly enlarged perspective view of FIG. 1A.

Now, embodiments of the present invention will be described in conjunction with the accompanying drawings. There are first, second, and third embodiments of the present invention. As shown in FIGS. 1A to 1C, a packing A as a common component as any of the embodiments is in an endless loop shape and flexible. The packing A is mounted to a device through which a fluid passes such as a pump, an engine, and a mission. The planar shape of the packing A is not limited to a typical shape such as a circular arc shape and a rectangular shape and may be substantially identical to the planar overall shape of the groove 8 in the housing B of the device which will be described.

More specifically, the housing B of the device includes a housing main body 6 and a cover plate 7, and one of the housing main body 6 and the cover plate 7 is provided with the groove 8 into which the packing A is inserted. In the following description, it is assumed that the groove 8 is formed on the side of the housing main body 6.

First, the first embodiment will be described (with reference to FIGS. 1A to 1C and FIGS. 2A to 2D). A packing A1 has an annular shape in the longitudinal direction and a uniform cross section along the entire periphery in the longitudinal direction, the packing A1 essentially has a top surface arcuate part 1, a bottom surface side arcuate part 2, and side arcuate parts 3 on both sides, both sides of the top surface arcuate part 1 and the side arcuate parts 3 on both sides are connected by upper connection surfaces 4 and both sides of the bottom surface side arcuate part 2 and the side arcuate parts 3 on both sides are connected by lower connection surfaces 5, and the packing has a maximum width between the side arcuate parts 3 on both sides. Note that the term "width" refers to the size in the left-right direction in the cross section shown in the drawings.

Figure 2A:
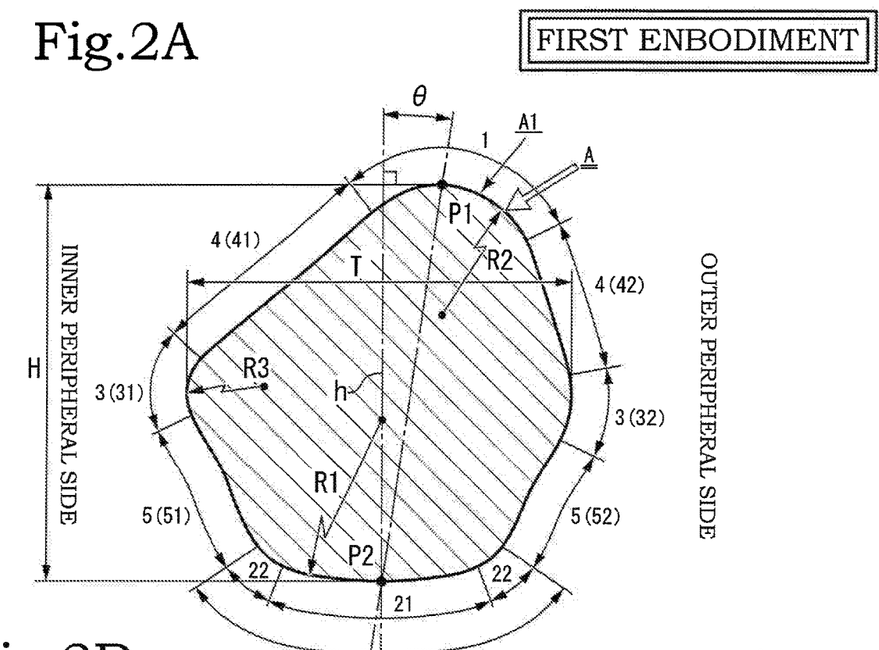
FIG. 2A is an enlarged cross sectional view of the packing according to the first embodiment of the present invention.

As viewed in cross section, the bottom surface side arcuate part 2 includes a large-width bottom arcuate part 21 on the center side in the width-wise direction and bottom end arcuate parts 22 at the opposite ends of the bottom arcuate part 21. The radius of curvature of the bottom arcuate part 21 is large so that the part approximates to the horizontal line. The radii of curvature of the bottom end arcuate parts 22 are significantly small and substantially equal between the left and right while one of the left and right bottom end arcuate parts 22 may have a slightly greater radius of curvature than that of the other.

When the radii of curvature of the bottom arcuate part 21 and the bottom end arcuate part 22 are R1 and R4, respectively, the following expression is established.

$$R4 < R1$$

The upper connection surfaces 4 on both sides and the lower connection surfaces 5 on both sides are formed to have a flat or slightly recessed shape. In particular, the recessed shape may reduce the filling ratio. This may also reduce the weight of the material. Note that the term "slightly" refers to the range from about 50 μm to 0.5 mm.

The angle θ between a segment which connects a peak P1 on the top surface arcuate part 1 in the height-wise direction and the lowermost point P2 of the bottom surface side arcuate part 2 in the height-wise direction and the vertical line h passing through the lowermost point P2 is formed as an outward inclination with respect to the annular shape (see FIGS. 1B and 2A). Here, the longitudinal direction of the packing A corresponds to the case of viewing parts of the packing A (see the position X1-X1 in FIG. 1A to the position X3-X3 in FIG. 1A), and the longitudinal direction may be referred to as the peripheral direction when the packing A as a whole is viewed.

In particular, when the radii of curvature of the bottom arcuate part 21, the top surface arcuate part 1, and the side arcuate parts 3 on both sides are R1, R2, and R3, respectively, the following expression is established.

$$R3 < R2 \leq R1$$

The packing A is mounted between the housing main body 6 and the cover plate 7 in the housing B to cover a pressure generating part such as an impeller and a rotor which generates pressure in the housing B, and the inner peripheral side of the packing A is positioned near the pressure generating part. Therefore, the inner peripheral side of the packing A is subject to the pressure of a fluid in the housing B of a pump or the like which works with the fluid.

Figures 2B, 2C, 2D:
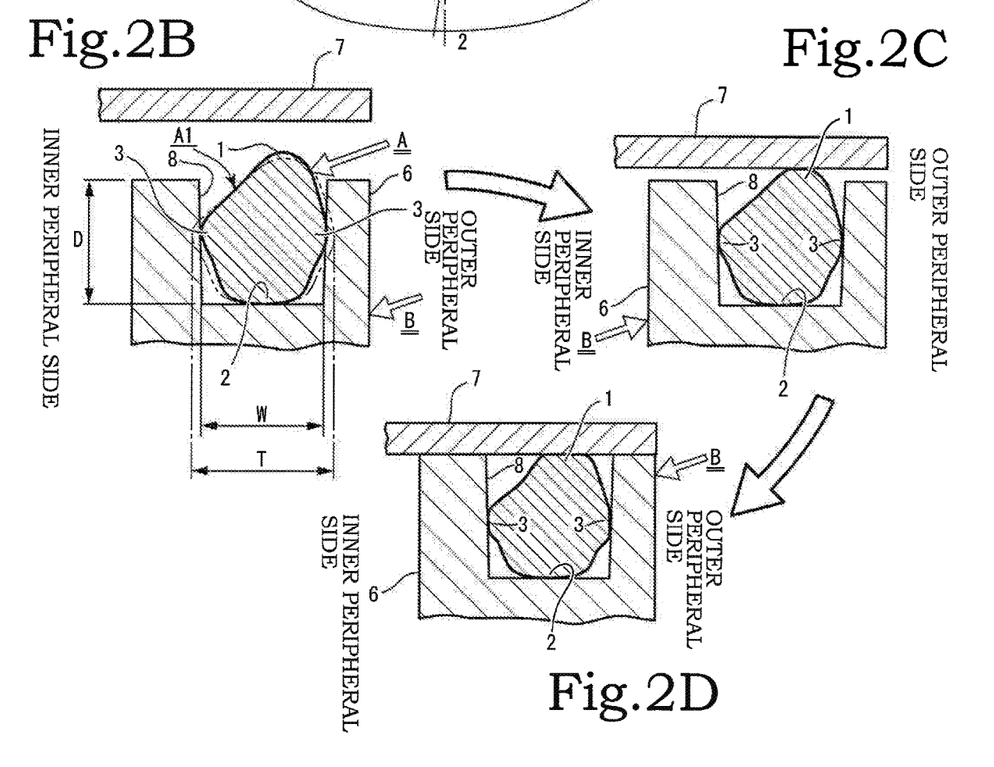
FIG. 2B is an enlarged cross sectional view of the packing according to the first embodiment being inserted into the groove of a housing in an initial state.
FIG. 2C is an enlarged cross sectional view of the packing in the process of being inserted into the groove after being pressed by a cover plate in FIG. 2B.
FIG. 2D is an essential-part enlarged cross sectional view of the packing according to the first embodiment completely inserted in the groove after being pressed by the cover plate in FIG. 2C.

When the height of the packing A1 in a free state is H and the depth of the groove 8 is D, the following expression is established.

$$D < H$$

The top surface arcuate part 1 of the packing A slightly protrudes from the opening of the groove 8. The part of the top surface arcuate part 1 of the packing A which slightly protrudes from an upper end surface of the opening of the groove 8 is pressed by the cover plate 7 (see FIG. 2C) and squashed to come into close contact with the cover plate 7, so that the housing B attains an airtight state (see FIG. 2D).

When the distance between the side arcuate parts 3 on both sides of the packing A in cross section orthogonal to the longitudinal direction in a free state is T and the groove 8 has a width W in the widthwise direction, the following expression is established.

$$W < T$$

This is for the purpose of preventing the packing A from dropping from the groove 8.

Here, The filling ratio of the packing A with respect to the groove 8 is the ratio of the area substantially occupied by the inserted packing A in cross section orthogonal to the longitudinal direction in the area of the groove 8 in cross section orthogonal to the longitudinal direction. With a filling ratio of 100%, the groove 8 is completely filled with the packing A. Therefore, when the filling ratio is less than 100%, there is a gap between the packing A and the groove 8 in the groove 8 having the packing A inserted therein. As the filling ratio decreases, the gap between the packing A and the groove 8 increases.

Therefore, the packing A can more easily be inserted into the groove 8 as the filling ratio is lowered to the smallest possible value. When insertion of the packing A into the groove 8 completes and the cover plate 7 is mounted to the housing main body 6, no part of the packing A protrudes from the groove 8, which can prevent any part of the packing A from coming into a small gap part between the housing main body 6 and the cover plate 7, so that damage to the packing A can be prevented while high airtightness can be maintained.

Figures 4A, 4B, 4C:
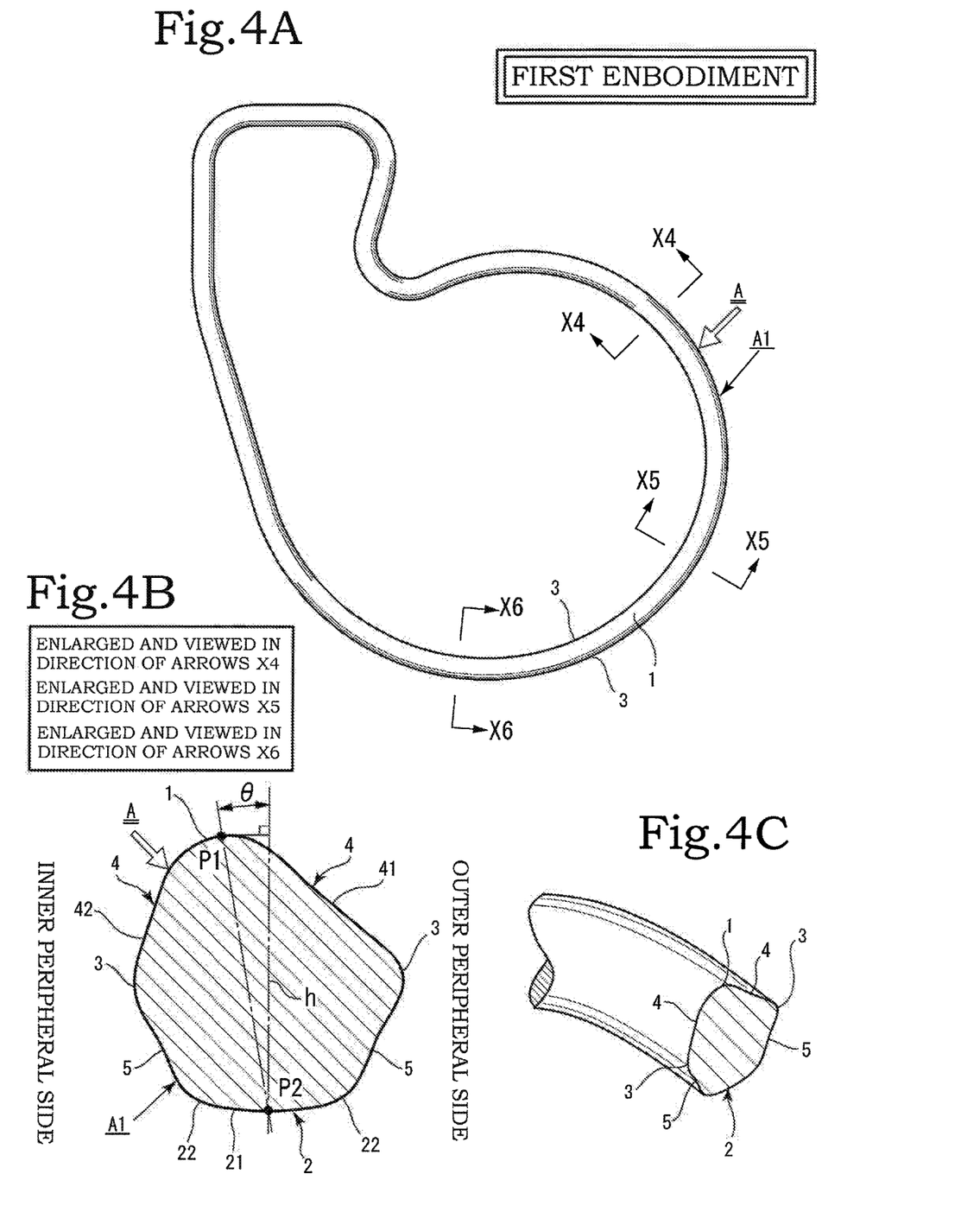
FIG. 4A is a plan view of a packing according to a modification of the first embodiment of the present invention.
FIG. 4B is an enlarged cross sectional view as viewed in the directions of arrows X4, X5, and X6 in FIG. 4A.
FIG. 4C is a partly enlarged perspective view of FIG. 4A.

As shown in FIGS. 1A to 1C and FIGS. 2A to 2D, the packing A1 according to the first embodiment of the present invention is adapted to a device in which the pressure inside the annular shape is raised, while as shown in FIGS. 4A to 4C, a packing A1 according to a modification of the first embodiment may be a mirror image of (symmetrical with respect to) the cross section shown in FIGS. 1B and 2A. The modification is adapted to a device in which the pressure inside the annular shape is lowered.

Now, the second embodiment of the invention will be described with reference to FIGS. 3A to 3D. Similarly to the packing A1 according to the first embodiment (see FIGS. 1A to 1C and FIGS. 2A to 2D), a packing A2 has an annular shape in the longitudinal direction and a uniform cross section in the longitudinal direction, the packing A2 essentially has a top surface arcuate part 1, a bottom surface side arcuate part 2, and side arcuate parts 3 on both sides, the opposite ends of the bottom surface side arcuate part 2 and the side arcuate parts 3 on both sides are connected by lower connection surfaces 5, and the packing has a maximum width between the side arcuate parts 3 on both sides.

Similarly to the first embodiment (see FIGS. 1A to 1C and FIGS. 2A to 2D), the angle θ between the segment which connects a peak P1 on the top surface arcuate part 1 in the height-wise direction and the lowermost point P2 of the bottom surface side arcuate part 2 in the height-wise direction and the vertical line h passing through the lowermost point P2 is formed as an outward or inward inclination with respect to the annular shape.

Figure 3A:
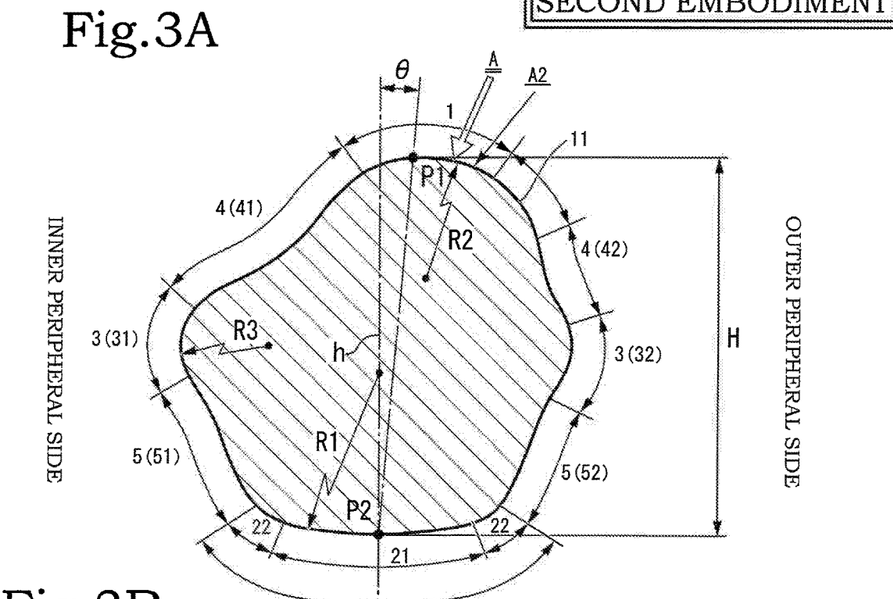
FIG. 3A is an enlarged cross sectional view of a packing according to a second embodiment of the present invention.
Figures 3B, 3C, 3D:
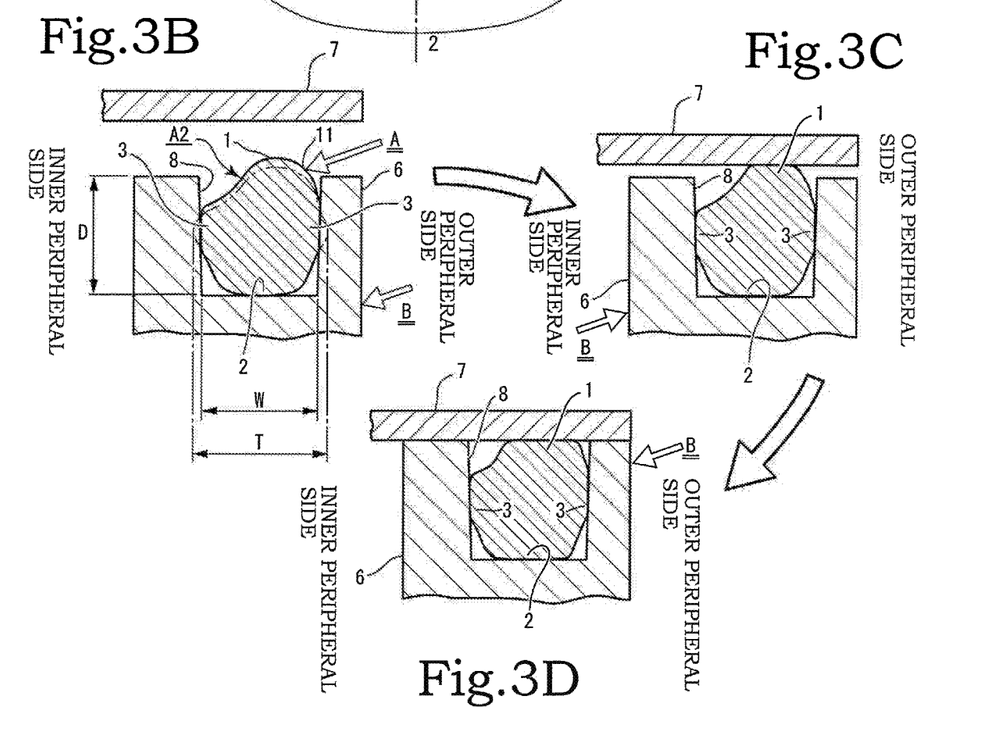
FIG. 3B is an enlarged cross sectional view of the packing according to the second embodiment being inserted into the groove of a housing in an initial state.
FIG. 3C is an enlarged cross sectional view of the packing in the process of being inserted into the groove after being pressed by the cover plate in FIG. 3B.
FIG. 3D is an essential-part enlarged cross sectional view of the packing according to the second embodiment completely inserted in the groove after being pressed by the cover plate in FIG. 3C.

In particular, the embodiment is different from the first embodiment (see FIGS. 1A to 1C and FIGS. 2A to 2D) in that as the part of the top surface arcuate part 1 on the side of the angle θ formed as an outward inclination is formed as a protrusion 11 which protrudes further outward (see FIG. 3A). In this case, the upper connection surfaces 4 continuous with the protrusion 11 are formed to be significantly short. In FIG. 3A, the upper connection surfaces 4 and the lower connection surfaces 5 are slightly recessed while these surfaces may substantially be flat. Note that a more recessed shape may reduce the amount of rubber to be used.

As the part of the top surface arcuate part 1 on the side of the angle θ formed as an outward inclination is formed as the protrusion 11 which protrudes further outward, a packing which can be prevented from falling even with higher pressure inside the annular shape can be provided. More specifically, the upper surface of the packing can be prevented from falling even when the water/hydraulic pressure is higher inside the annular shape.

The third embodiment of the present invention will be described with reference to FIGS. 5A to 5D. A packing A3 has an annular shape in the longitudinal direction and a uniform cross section in the longitudinal direction, the packing A3 has a top surface arcuate part 1, a bottom surface side arcuate part 2, and side arcuate parts 3 on both sides, the opposite ends of the top surface arcuate part 1 and the side arcuate parts 3 on both sides are connected by upper connection surfaces 4.

Figure 5A:
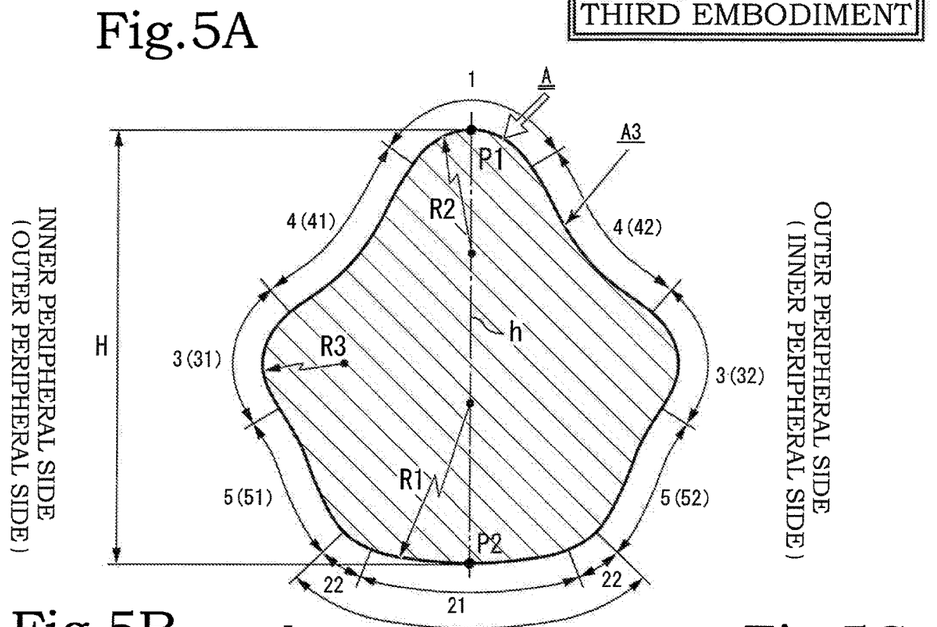
FIG. 5A is an enlarged cross sectional view of a packing according to a third embodiment of the present invention.
Figures 5B, 5C, 5D:
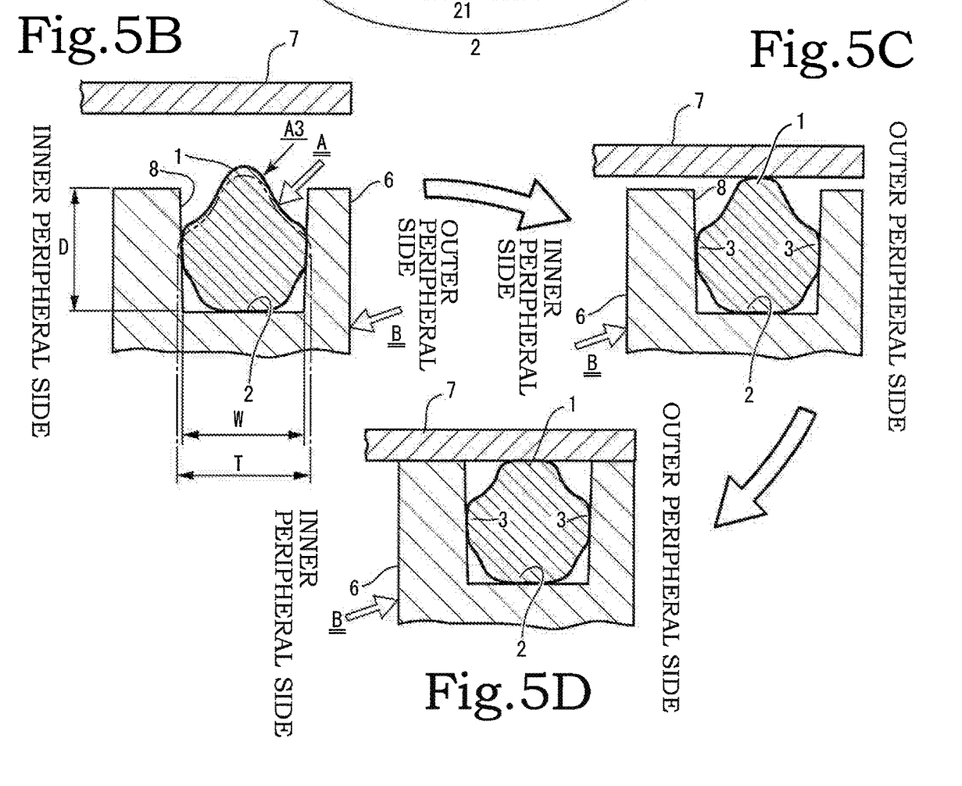
FIG. 5B is an enlarged cross sectional view of the packing according to the third embodiment being inserted into the groove of a housing in an initial state.
FIG. 5C is an enlarged cross sectional view of the packing in the process of being inserted into the groove after being pressed by the cover plate in FIG. 5B.
FIG. 5D is an essential-part enlarged cross sectional view of the packing according to the third embodiment completely inserted the groove after being pressed by the cover plate in FIG. 5C.

The bottom surface side arcuate part 2 includes a large-width bottom arcuate part 21 on the center side in the widthwise direction and bottom end arcuate parts 22 at the opposite ends of the bottom arcuate part 21 in a symmetrical arrangement. Similarly to the first and second embodiments, the opposite ends of the bottom surface side arcuate part 2 and the side arcuate parts 3 on both sides are connected by lower connection surfaces 5, and the packing has a maximum width between the side arcuate parts 3 on both sides.

In particular, the third embodiment is different from the first embodiment (see FIGS. 1A to 1C and FIGS. 2A to 2D) and the second embodiment (see FIGS. 3A to 3D) in that the peak P1 of the top surface arcuate part 1 is present on the vertical line h passing through the center position in the widthwise direction of the bottom surface side arcuate part 2. More specifically, this arrangement is symmetrical. This is significantly different from the first and second embodiments according to which the top surface arcuate part 1 is inclined at angle θ and formed in an asymmetrical arrangement. In the packing A according to the third embodiment, the upper connection surfaces 4 on both sides and the lower connection surfaces 5 on both sides are formed to have a flat or slightly recessed shape. The recessed shape may reduce the filling ratio if slightly, and the weight of the material can be reduced.

According to the second embodiment (see FIG. 3A) and the third embodiment (see FIG. 5A), when the packings A2 and A3 in a free state have a height H and the groove 8 has a depth D, the following expression is established.

$$D<H$$

When the packing A in a free state has a width T in cross section orthogonal to the longitudinal direction of the side arcuate parts 3 on both sides and the width of the groove 8 is W, the following expression is established.

$$W<T$$

The function and effect thereof are the same as those according to the first embodiment (see FIG. 2A).

According to the second embodiment, the angle is formed as an outward inclination with respect to the annular shape, and therefore the upper surface of the packing can be prevented from falling by high water/hydraulic pressure inside. In particular, the packing is less likely to fall to the outer side when high pressure is frequently generated inside. In order to prevent the upper surface of the packing from falling to the outer side by high water/hydraulic pressure inside, the upper surface of the packing is inclined in advance to the outer side with respect to the center position in the widthwise direction. Conversely to the second embodiment, the upper surface of the packing can be prevented from falling by low water/hydraulic pressure inside according to the third embodiment.

According to the fourth embodiment, the bottom surface side arcuate part is formed of a large-width bottom arcuate part having a large radius of curvature on the center side, and bottom end arcuate parts having a small radius of curvature and connected to the opposite ends of the bottom arcuate part, so that a packing with particularly stable sealing performance can be provided. According to the fifth embodiment, the upper connection surfaces on both sides and the lower connection surfaces on both sides have a flat or slightly recessed shape, so that not only the amount of the packing material to be used can be reduced, but also the filling ratio of the packing can be reduced. In particular, the recessed shape can reduce the amount of rubber and the filling ratio, and the material cost for the rubber can be reduced.

According to the sixth embodiment, in the packing according to the second or third embodiment, the lower connection surfaces on both sides and the upper connection surface on the inner side have a flat or recessed shape, and the top surface arcuate part has an outer side formed to protrude further outward, so that a packing capable of providing good sealing upon higher pressure on the inner or outer side of the annular shape can be provided. More specifically, the packing is advantageous in that the upper surface of the packing can be prevented from falling by higher water/hydraulic pressure inside the annular shape.

According to the seventh embodiment, when the radii of curvature of the bottom arcuate part, the top surface arcuate part, and the side arcuate part are R1, R2, and R3, respectively, the following expression is established.

$$R3 < R2 \leq R1$$

Therefore, at the bottom, the position of the mounted packing can be stable, which prevents the mounted packing from falling, and its sealing performance is secured. The upper surface is an arcuate part having a size equal to or smaller than the bottom surface, which is advantageous in falling-prevention. In addition, the side arcuate part has a small radius of curvature, and therefore the amount of rubber can be reduced.

In a packing according to the eighth embodiment, the angle at a part of the annular shape in the longitudinal direction is formed as an outward inclination with respect to the annular shape, and the angle at another part of the annular shape in the longitudinal direction is formed as an inward inclination with respect to the annular shape, so that the annular packing can be prevented from coming off and can successfully achieve the function of falling-prevention for example when there is a region at one part of the annular shape where the pressure is higher on the inner side and there is a region at another part of the annular shape where the pressure is lower on the inner side.

According to the ninth embodiment, the peak on the top surface arcuate part in the height-wise direction is present on the vertical line in the center position in the width-wise direction of the bottom surface side arcuate part, whereby the packing has a symmetrical shape, and as described in the first embodiment, the packing has arcuate shapes rather than flat shapes at the upper and lower surfaces, and in particular, an arcuate shape at the bottom, so that surface pressure generated at the time of squashing the packing (mounting the packing) is increased, and even higher sealing performance (adhesion) can be provided.

Furthermore, the packing has an annular shape and a uniform cross section along the entire periphery of the packing, which eliminates the necessity of using a complicated mold shape, and the mold cost and thus the manufacturing cost can be reduced. In addition, since the packing has an annular shape and a uniform cross section along the entire periphery of the packing, the sealing function (the tensile force of rubber) is advantageously uniform and stable. This cross sectional shape can reduce the filling ratio of the packing.

According to the tenth embodiment of the invention, in the packing according to the ninth embodiment, the upper connection surfaces on both sides and the lower connection surfaces on both sides have a flat or recessed shape, so that the filling ratio of the packing can be reduced while necessary sealing performance is secured.

What is claimed is:

1. A packing having an annular shape in a longitudinal direction and a uniform cross section in the longitudinal direction,
    wherein the packing includes a top surface arcuate part, a bottom surface side arcuate part, and side arcuate parts on both sides as viewed in the cross section,
    wherein opposite ends of the top surface arcuate part and the side arcuate parts on both sides are connected by upper connection surfaces, and opposite ends of the bottom surface side arcuate part and the side arcuate parts on both sides are connected by lower connection surfaces,
    wherein the packing has a maximum width between the side arcuate parts on both sides,
    wherein an angle formed by a segment which connects a peak on the top surface arcuate part in a height-wise direction and a lowermost point of the bottom surface side arcuate part in the height-wise direction, and a vertical line passing through the lowermost point, is formed as an outward or an inward inclination with respect to the annular shape,
    wherein the peak on the top surface arcuate part and the lowermost point of the bottom surface side arcuate part are each formed as a single point, and
    wherein the packing is formed to have a bilaterally asymmetrical cross section.

2. The packing according to claim 1, wherein the angle is formed as an outward inclination with respect to the annular shape.

3. The packing according to claim 1, wherein the angle is formed as an inward inclination with respect to the annular shape.

4. The packing according to claim 2, wherein the bottom surface side arcuate part includes a large-width bottom arcuate part having a large radius of curvature on a center side, and bottom end arcuate parts having a small radius of curvature and connected to opposite ends of the bottom arcuate part.

5. The packing according to claim 2, wherein the upper connection surfaces on both sides and the lower connection surfaces on both sides have a flat or recessed shape.

6. The packing according to claim 2, wherein the lower connection surfaces on both sides and the upper connection surface on an inner side have a flat or recessed shape, and the top surface arcuate part has an outer side formed to protrude further outward.

7. The packing according to claim 4, wherein, when radii of curvature of the bottom arcuate part, the top surface arcuate part, and the side arcuate parts are R1, R2, and R3, respectively, following expression is established.

$$R3 < R2 \leq R1$$

8. A packing having an annular shape in a longitudinal direction, wherein the packing includes a top surface arcuate part, a bottom surface side arcuate part, and side arcuate parts on both sides as viewed in a cross section, wherein opposite ends of the top surface arcuate part and the side arcuate parts on both sides are connected by upper connection surfaces, and opposite ends of the bottom surface side arcuate part and the side arcuate parts on both sides are connected by lower connection surfaces, wherein the packing has a maximum width between the side arcuate parts on both sides, wherein an angle formed by a segment which connects a peak on the top surface arcuate part in a height-wise direction and a lowermost point of the bottom surface side arcuate part in the height-wise direction, and a vertical line passing through the lowermost point, is formed as an outward or inward inclination with respect to the annular shape, wherein the angle at a part of the annular shape in the longitudinal direction is formed as an outward inclination with respect to the annular shape, and the angle at another part of the annular shape in the longitudinal direction is formed as an inward inclination with respect to the annular shape, wherein the peak on the top surface arcuate part and the lowermost point of the bottom surface side arcuate part are each formed as a single point, and wherein the packing is formed to have a bilaterally asymmetrical cross section.

9. The packing according to claim 3, wherein the bottom surface side arcuate part includes a large-width bottom arcuate part having a large radius of curvature on a center side, and bottom end arcuate parts having a small radius of curvature and connected to opposite ends of the bottom arcuate part.

10. The packing according to claim 3, wherein the upper connection surfaces on both sides and the lower connection surfaces on both sides have a flat or recessed shape.

11. The packing according to claim 3, wherein the lower connection surfaces on both sides and the upper connection surface on the inner side have a flat or recessed shape, and the top surface arcuate part has an outer side formed to protrude further outward.

12. The packing according to claim 9, wherein, when radii of curvature of the bottom arcuate part, the top surface arcuate part, and the side arcuate parts are R1, R2, and R3, respectively, following expression is established.

$$R3 < R2 \leq R1$$

13. The packing according to claim 1, wherein the upper connection surfaces on opposing sides of the packing include flat surfaces.

14. The packing according to claim 13, wherein the lower connection surfaces on opposing sides of the packing include flat surfaces.

15. The packing according to claim 1, wherein, as viewed in the cross section, a thickness of the packing in a horizontal direction continuously increases as the packing extends from the single point of the peak on the top surface arcuate part to each of the upper connection surfaces.

16. The packing according to claim 15, wherein, as viewed in the cross section, the thickness of the packing in the horizontal direction increases as the packing extends from the single point of the lowermost point of the bottom surface side arcuate part to each of the lower connection surfaces.

17. The packing according to claim 1, wherein, as viewed in the cross section, with respect to a horizontal centerline that passes through a center of the packing, the packing has different amounts of surface areas on opposing sides of the horizontal centerline.

18. The packing according to claim 8, wherein, as viewed in the cross section, a thickness of the packing in a horizontal direction continuously increases as the packing extends from the single point of the peak on the top surface arcuate part to each of the upper connection surfaces, and the thickness of the packing in the horizontal direction increases as the packing extends from the single point of the lowermost point of the bottom surface side arcuate part to each of the lower connection surfaces.

* * * * *